Patented Aug. 18, 1936

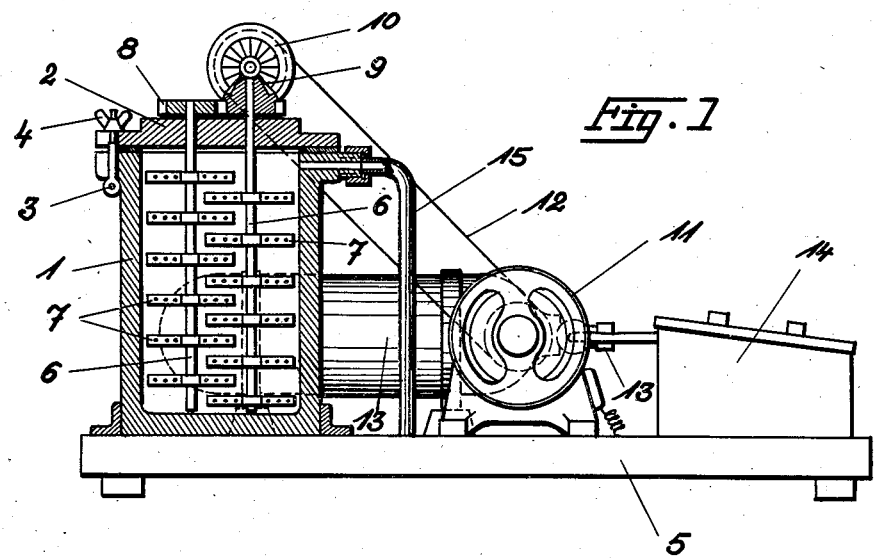
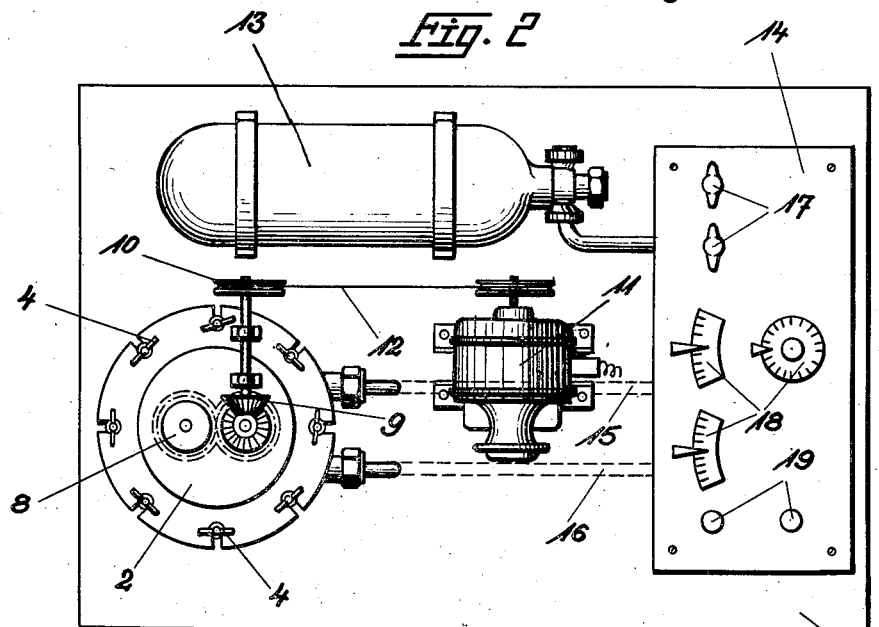
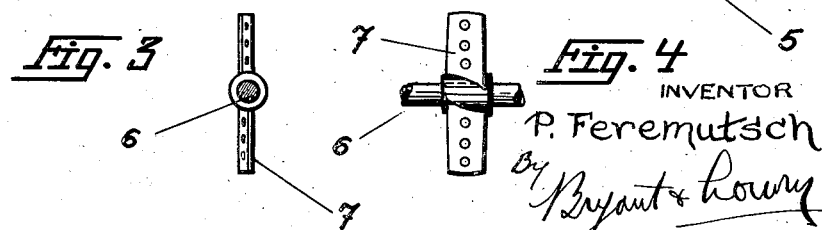

2,051,797

UNITED STATES PATENT OFFICE 2,051,797

PROCESS FOR THE CONVERSION OF MILK AND CREAM INTO BUTTER

Paul Feremutsch, Zurich, Switzerland

Application October 26, 1932, Serial No. 639,675. Renewed January 18, 1936. In Switzerland November 2, 1931

1 Claim. (Cl. 99—119)

I have filed an application in Switzerland, on the 2nd November, 1931, and in Germany, on the 3rd November, 1931 (process); in Germany, on the 25th May, 1932 (apparatus).

The present invention relates to processes for the conversion of milk and cream into butter.

According to the most recent researches on the chemistry of colloids the process of formation of butter is to be regarded as a coagulation process. Milk consists of fat, albuminous bodies (casein, albumen and traces of globulines), milk-sugar, mineral constituents (salts) and water. The milk-sugar and the mineral constituents are in true solution in the water (i. e. in the condition of maximum disperse as molecules and ions), the albuminous bodies are present in colloidal subdivision (i. e. in the form of most minute particles of a few millions of a millimetre diameter) and the fat is present in the form of an emulsion in relatively coarse disperse subdivision. The stability of a fat emulsion of this kind, such as is exhibited by the milk, remains stable so long as the colloids, and the coarse disperse fat phase are electrically charged with ions which are located on the surface, i. e. so long as they exhibit a certain electric potential with regard to the dispersion means, i. e. the liquid, or so long as they are strongly hydrated, in which latter case however the electric charge also plays a part so that when, for any reason, dehydration occurs, the stability of the disperse system is determined by the charge of the particles. The researches of H. A. Sirks provide information regarding the charges of the spheroidal fat particles.

If, now, in a given system there is no electric charge or no sufficient hydration, then the particles remain adhering to one another when they strike one another owing to their inherent Brown movement (a trembling irregular movement of the particles in consequence of the molecular impacts of the liquid). The impacts occur in concentrated solutions fairly frequently so that in a short time a system of uncharged or discharged particles coagulates to form large coagulates and flocks, precipitates or curdles. Stable distributions or subdivisions of fat in water are known in cases when the reaction is feebly alkaline (i. e. when hydroxyl ions are present), whereby the fat particles become charged. In neutral or weakly acid systems, such as those exhibited by milk, a stable subdivision of the fat without the presence of a further stabilizing agent would not be conceivable. Besides charging ions, so-called protective colloids come into consideration for use as stabilizing agents. The said protective colloids are colloidal substances (certain albuminous bodies or the like) which, in consequence of their having a great affinity for the solvent means are themselves strongly hydrated and very stable. Such substances form very easily around the particles of less stable subdivisions hydrated sheaths and transmit their hydrophyle stable character to those particles which are less stable or not stable at all.

Now, it is well known that albuminous substances are present in milk and it must be assumed, for purely theoretical reasons even without any particular knowledge of confirmatory observations, that albuminous bodies adhere to the spheroidal fat particles in the form of protective sheaths. The assumption of the existence of such sheaths around the spheroidal particles of fat is adopted universally to-day in dairy practice. The sheath is generally referred to as a serum sheath (formerly known as a haptogen membrane), the term being used to indicate an albuminous body the chemical character of which has not yet been clearly determined. The body in question possesses, however, without doubt, strong surface activity; it accumulates at all the boundary surfaces (with the formation of froth) to a considerable extent and lowers the boundary surface tension. As a body possessing surface activity it must likewise adhere to the boundary surface fat-water and thereby bring its protective colloidal action into operation. It can therefore be assumed with certainty that there is an albuminous sheath around the spheroidal fat particles in milk.

According to the actual facts set forth in the literature of the subject, two differently proceeding processes of coagulation of the fat in milk can be distinctly recognized, namely the curdling operation and the butter formation. In the case of the curdling operation a so-called orthokinetic coagulation effect (according to Wiegner) takes place, the albuminous sheaths around the spheroidal particles of fat not being affected. Under the influence of the rising on the surface of the milk on standing, an accumulation of fat, the so-called layer of cream, comes into being, loose, easily redispersible coagulates being formed in the cream.

In contradistinction to this phenomenon there is no doubt that in the case of the operation of butter formation an irreversible coagulation effect occurs. A complete coagulation, such as is exhibited in the formation of butter, takes place when the particles are completely discharged by an increase of the electrolyte content in the external liquid. In the case of fresh milk, however, a coagulation into the form of butter does not take place at once on increase of the electrolyte content, but the butter coagulation only occurs when the protective albuminous sheaths of the spheroidal particles of fat are removed or at least broken down to a considerable extent. This is the essential difference as compared with the curdling process.

In practice it is observed that the formation of butter takes place under the following conditions:

1. When the milk or the cream has, in consequence of the natural souring action or acidification (bacterial action), attained a certain degree of sourness or acidification (cream ripening).

2. When the milk or the cream which has been soured to the most favourable extent is operated upon mechanically, i. e. by beating, whirling, shaking or whipping.

3. It is universally true and has been proven by experiment that for the formation of butter there must be a froth existent which is produced by the mechanical treatment set forth in the preceding paragraph in combination with the action of atmospheric air or another gas.

The principal object of the process according to the present invention is to fulfil the said three conditions in a simpler and more effective manner than that hitherto employed and thereby to reduce the time required for the conversion into butter to a fraction of the time which was hitherto necessary. It was found by experiment that the process for formation of butter can be effected much more rapidly and simply as compared with all the hitherto known practically applicable procedures, if the said process is carried out directly with milk or cream by means of a purely mechanical agitation or whipping of the liquid whilst supersaturated with carbonic acid and whilst being maintained constantly under carbonic acid gas pressure during the process.

As a result of this the following new effects are obtained:

By the supersaturation of the milk with carbonic acid under a pressure of several atmospheres the concentration of hydrogen ions in the system is increased immediately, whilst in the butter formation processes customary to-day by means of bacterial activity a degree of acidity is only obtained after some time by the natural formation of lactic acid, which makes the milk and the cream ripe for conversion into butter. According to the present process the milk is rendered ripe for conversion into butter immediately.

Moreover, the supersaturation of the material under treatment which is maintained presents the advantage that an increase of the number of gas bubbles and consequently an increase of the total boundary surface carbonic acid-liquid is obtained, whereby the formation of froth is relatively increased.

Moreover, as compared with the known attempts to produce butter by passing a current of air through the material, in the case of the employment of static superpressure advantage is taken of the fact that the protective albumen exhibits a greater affinity for carbonic acid than for air and that consequently the adsorption of the albuminous bodies at the boundary surface carbonic acid-liquid is greater than at the boundary surface air-liquid.

Furthermore, the protective action of the albumen is weakened by the acid reaction (increased concentration of hydrogen ions) by the employment of carbonic acid.

By taking into account all these physical and chemical effects in the process according to the present invention it is rendered possible to decrease the time required for the formation of butter from minutes to seconds, and the butter obtained by the treatment of milk or cream with carbonic acid in the manner set forth is fresher and more pleasant to the taste and also keeps better than is the case when a treatment by means of air is employed. Bacteriological investigations have shown that when carbonic acid is employed according to the process forming the subject matter of the present application, a very considerable adsorption of micro organisms by the carbonic acid gas takes place, as a result of which the butter obtained is more free from bacteria.

A preferred constructional form of an apparatus for carrying out the process according to the invention is illustrated by way of example in the accompanying drawing, in which:—

Fig. 1 shows the apparatus in side elevation partly in section,

Fig. 2 is a plan of the apparatus, and

Figs. 3 and 4 show details thereof.

Referring to the drawing:

The reference numeral 1 denotes a high pressure vessel or autoclave made, for example, of glass, stoneware, a suitable metal or the like, which is closed at the bottom and is provided at the top with a packed closing cover 2, in such manner that it can be tightly sealed against internal high pressure gas. The said cover may, for example, be pressed tightly against the packing and the pressure vessel 1 by means of screw bolts which are rotatably mounted on pins 3, by the aid of wing nuts 4. The reference numeral 5 denotes a base plate upon which the pressure vessel 1 is rigidly mounted. Two vertical spindles 6 are mounted so as to be rotatable in the cover 2. The said spindles are provided with perforated vanes 7, the radii of the fields of action of which are staggered with regard to one another (Figs. 3 and 4). The two spindles 6 are operatively connected with one another for the transmission of motion by means of pinions 8 engaging with one another. One of these pinions 8 is connected by means of a bevel gear 9 with a rope pulley 10. The parts 6 and 7 in the constructional form illustrated by way of example, form an internal mechanism for the application of violent mechanical force to the contents of the pressure vessel. The reference numeral 11 denotes an electro-motor which sets the rope pulley 10 and consequently the internal mechanism 6, 7 in rapid rotation through the medium of a rope 12. The reference numeral 13 denotes a carbonic acid cylinder which is connected through the medium of a control box 14 with a gas conduit 15 leading to the interior of the pressure vessel. The reference numeral 16 denotes a discharge conduit which leads from the interior of the pressure vessel 1 into the open air. The control box may, for example, be provided with control buttons 17 for opening and closing the two conduits 15 and 16, scales 18 for measuring and regulating the amount of the pressure above atmospheric pressure in the pressure vessel 1, press buttons for actuating a time switch for the electro-motor, and similar members which do not form part of the subject-matter of the invention.

It has already been proposed to remove the uncompressed air content of a butter cask, on account of its oxidizing action and its action in assisting the development of bacteria, by means of carbonic acid without employing superpressure, i. e. pressure above atmospheric pressure, but it did not prove possible to obtain in this manner, for example, the immediate increase of the concentration of the hydrogen ions by supersaturation with gas such as is intended according to the present invention. Milk which is treated without supersaturation with carbonic acid, without a pressure above atmospheric which is constantly maintained and without continuous violent mechanical agitation, only yields, on account of the non-occurrence of the irreversible coagulation, a milk for drinking purposes which is charged with carbonic acid. The employment of a current of pressure air alone, particularly without mechanical agitation or whipping and without the employment of a hermetically-sealed pressure vessel does not render possible, as has been explained above, either the immediate ripening of the materials for conversion to butter or the essential large adsorption of the protective albumen. Moreover, the detrimental effect of the oxygen of the air is not eliminated.

I claim:

A process for the conversion of milk and cream into butter comprising the introduction of milk and cream into a container, the supersaturation of the milk and cream with carbonic acid, and the mechanical agitation of the milk and cream within the container whilst subjecting them in the container to a continuously maintained pressure above atmospheric pressure by means of compressed carbonic acid.

PAUL FEREMUTSCH.